United States Patent

[11] 3,584,217

[72] Inventor Charles R. Woodburn
    440 Serraine Ave., Long Beach, Calif. 90814
[21] Appl. No. 788,267
[22] Filed Dec. 31, 1968
    Continuation-in-part of Ser. No. 524,135, Feb. 1, 1966, abandoned.
[45] Patented June 8, 1971

[54] RADIOACTIVE FORCE INDICATING DEVICE
    5 Claims, 6 Drawing Figs.
[52] U.S. Cl. .................................................. 250/83.3,
    73/141, 250/43.5, 250/44, 250/106
[51] Int. Cl. .............................................. G01t 1/16,
    G01l 1/04
[50] Field of Search .......................................... 250/83,
    83.3, 83.3 D, 83.6, 106, 44, 43.5; 73/141

[56] References Cited
    UNITED STATES PATENTS
| | | | |
|---|---|---|---|
| 2,933,607 | 4/1960 | Friedman | 250/43.5DX |
| 3,024,364 | 3/1962 | Wanetick | 250/83.3 |
| 3,113,464 | 12/1963 | Shulman | 250/106X |
| 3,254,211 | 5/1966 | Black | 250/43.5R |
| 3,269,174 | 8/1966 | Linville | 73/141AX |
| RE.26,335 | 1/1968 | Chope | 250/43.5D |
| 3,431,417 | 3/1969 | Chope | 250/83.3 |

Primary Examiner—Archie R. Borchelt
Assistant Examiner—Morton J. Frome
Attorney—Georges A. Maxwell ABSTRACT: The invention relates to a means for determining the force applied between related parts comprising a resilient, compressible body of radioactive material having a predetermined, substantially constant emission rate, force transmitting structure between said body and parts whereby forces exerted through the construction are transmitted onto and through the body so as to compress the body and reduce or increase its volumetric extent in direct predetermined relationship to the force exerted thereon, an emission shield related to the body with an emission port therein, the cross section of which is less than the normal cross section of the body and substantially equal to the cross section of the body when it is in its fully compressed condition and an emission counter spaced from and in alignment with the port and adapted to count the volume of emission flowing through the part and translate it into force units.

PATENTED JUN 8 1971
3,584,217
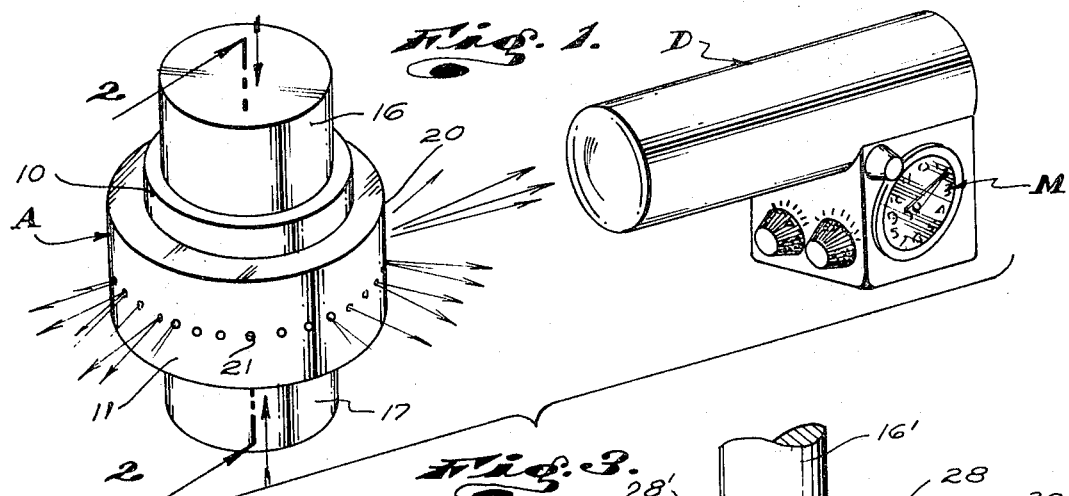
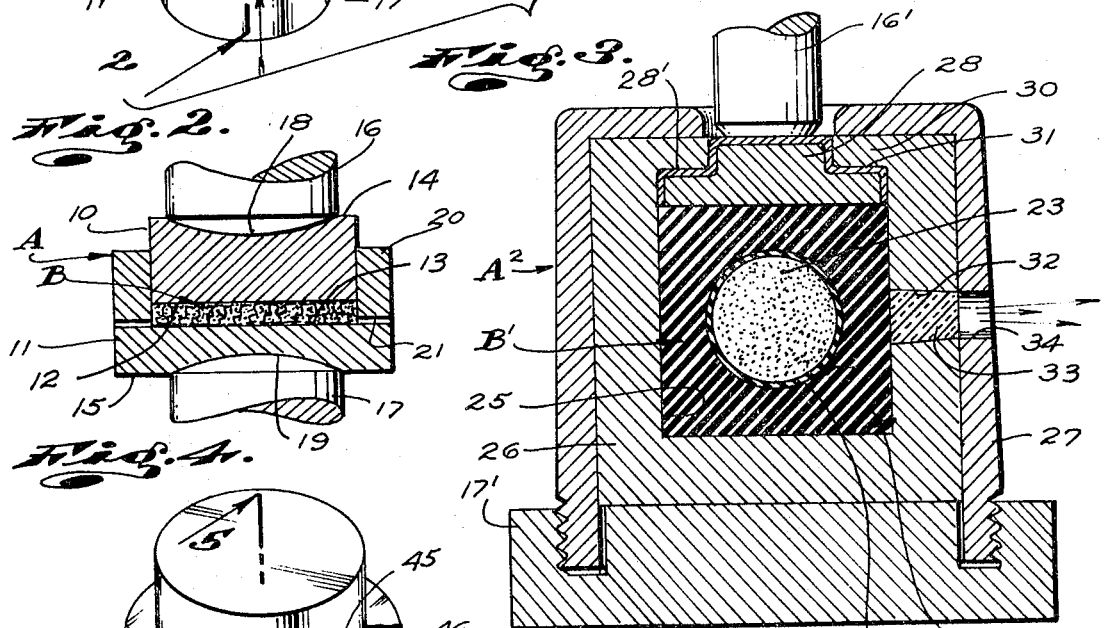
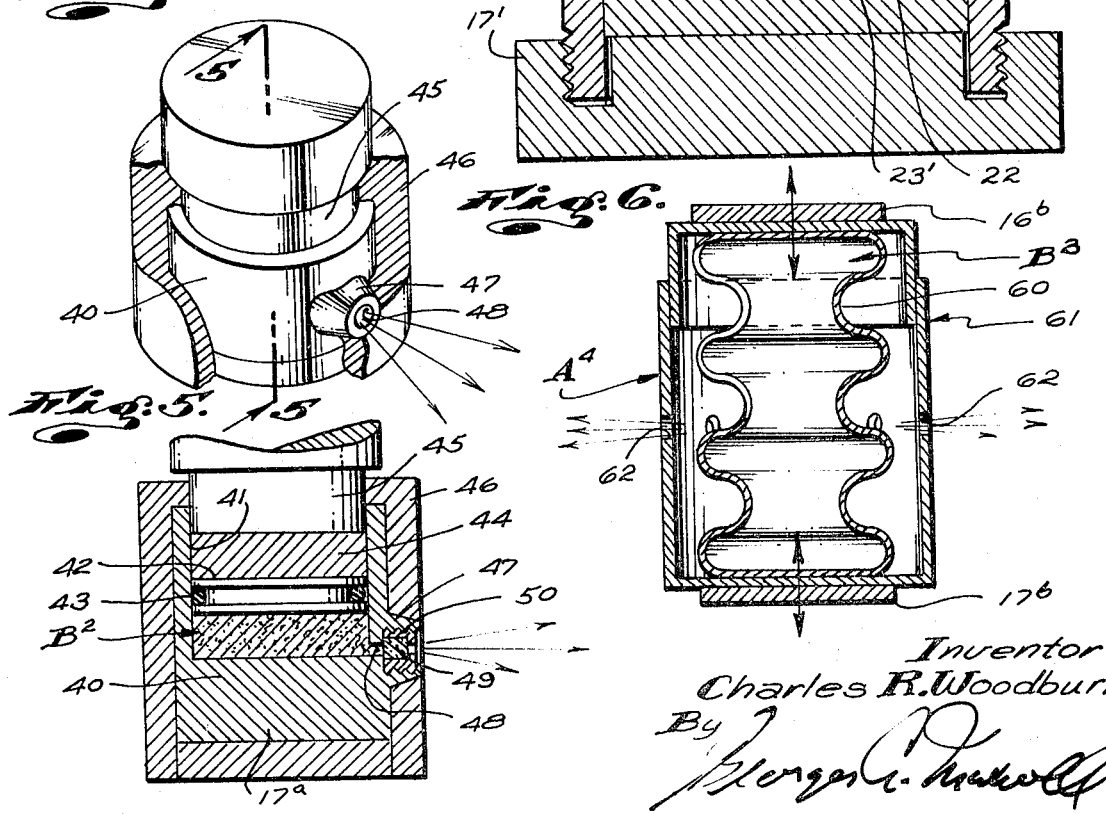
Inventor
Charles R. Woodburn
By
George C. [illegible]
Attorney

RADIOACTIVE FORCE INDICATING DEVICE

This application is a continuation-in-part of my copending application Ser. No. 524,135, filed Feb. 1, 1966, now abandoned entitled "Weight-Force Sensing Means."

The invention has to do with a weight and/or force indicating means and is more particularly concerned with that type or class of device commonly referred to as "load cells."

Throughout industry there is an ever-increasing requirement and/or demand that weight loads both static and dynamic, in and throughout static and dynamic structures and mechanisms be accurately controlled and recorded.

To date, the means employed to determine and record the weight loads and forces encountered in structures and mechanisms have involved the application and/or installation of load cells, strain guages and other suitable transducers, which are such that when they are subjected to external forces, they alter or vary an electric current conducted through them. The variation of current flow through a transducer is transcribed by suitable instrumentation into force units.

Other force reading and indicating means have involved pneumatic, hydraulic and mechanical means, but such means have proven to be extremely limited, in application, and are of little significance.

The principal shortcoming of most load sensing transducers provided by the prior art resides in the fact that they must be connected with wires to send and receive the electrical signals, or they must be arranged in a predetermined, substantially fixed position where they can be viewed and read.

Another shortcoming found in the transducer structures provided by the prior art resides in the fact that they are sensitive to moisture, temperature and other environmental conditions and are extremely unstable.

There is great need for a transducer structure of small dimensions and weight which does not require connection with remote transcribing and/or reading means by means of electrical wires, tubes and the like.

Further, there is great need for transducer structures which are such that they can be arranged or positioned on or within a structure in isolated relationship from the means required to transcribe and indicate or record the signals issuing therefrom.

Still further, there is a need for a transducer structure which is stable and dependable within greater limits than those transducers provided by the prior art.

It is an object of this invention to provide a novel weight and/or force sensing and indicating means including a transducer and a transcribing or reading device which is such that the transducer need not be connected with the transcribing and reading device in any manner, but rather, is mechanically and/or structurally isolated therefrom.

Another object of this invention is to provide a transducer of the character referred to which is such that it can be made extremely small in size and extremely strong and durable.

Yet another object of my invention is to provide a transducer of the character referred to which is such that it can be made with a predetermined life expectancy ranging from a number of days to many years.

There are a large number of radioactive materials such as radium, uranium 35 and Radon gas. Further, there are a larger number of materials which, when subjected to radioactive bombardment, in an atomic pile or the like, are charged and become radioactive, that is, they are radioactivated. Examples of such radioactivated materials are radioactive or activated cobalt and Bismoth.

Radioactive materials such as referred to above, emit or radiate particles of energy, commonly referred to as rays, at a rate which is, from a practical standpoint, constant and determinable. That variation which does exist is a constant and known or determinable diminishing of emission which is in known ratio to the radioactive life of the material itself.

In a great number of such materials, the rate at which emission diminishes is so slow that it can only be detected by careful observations and examination over protracted periods of time, often running many years.

There exists several means or devices for determining the rate of emission from radioactive materials. The most common of such means or devices are commonly referred to or known as Geiger counters and Scintillators. These devices are or can be made so as to measure the rate of emission from radioactive materials very accurately. Further, these and other similar devices are such that they need not come into contact with the radioactive material they are being employed to read, but detect and read the emission from the material when spaced a substantial distance therefrom.

It is an object of my invention to provide a weight-force sensing means which involves a body or volume of compressible radioactive material arranged between a pair of related force or weight transmitting elements and adjacent to an apertured or ported shield, which elements are engageable in or with a structure or mechanism through which forces to be measured are transmitted.

The invention further includes a radio emission sensing and reading device adapted to be arranged in predetermined spaced relationship from the weight-force sensing means to read the emission from the material flowing through and from the shield and to convert the variations of emission into the weight or force units.

The various objects and features of my invention will be fully understood from the following detailed description of typical preferred forms and applications of my invention, throughout which description reference is made to the accompanying drawings, in which:

FIG. 1 is an isometric view of a weight-force sensing means provided by this invention, showing a radioactive transducer unit and a related radio emission sensing and reading device;

FIG. 2 is a sectional view of the transducer taken as indicated by line 2–2 on FIG. 1;

FIG. 3 is a sectional view of another form of transducer unit provided by the present invention;

FIG. 4 is an isometric view of yet another form of transducer;

FIG. 5 is a sectional view taken as indicated by lines 5–5 on FIG. 4; and,

FIG. 6 is a sectional view of yet another form of transducer embodying the present invention.

The weight-force sensing and indicating means that I provide and which is illustrated in FIGS. 1 and 2 of the drawings include a radioactive transducer A involving a pair of flat, disc-shaped force transmitting members 10 and 11 with flat opposing inner faces 12 and 13 of predetermined cross-sectional area, oppositely disposed outer work-engaging faces 14 and 15 and a compressible radioactive element B between the opposing inner faces 12 and 13.

The radioactive element B can be in the form of a body of plastic, rubber, or the like, impregnated or combined with a uniformly distributed or disbursed filler or granular or powered radioactive or radioactivated material or can be a body of compressible noninterconnected cellular material, the cells of which are filled with a radioactive or radioactivated, compressible gas, such as radioactive argon.

The members 10 and 11 are adapted to be arranged between a pair of opposing work load transmitting parts of a structure or mechanism. In the case illustrated, they are shown engaged between the opposing ends of a pair of axially aligned load transmitting columns 16 and 17, which columns can be parts or elements of a related structure or mechanism or can be in the nature of special coupling parts to extend between the transducer A and parts of a related structure or mechanism.

In practice, the outer surfaces 14 and 15 of the members 10 and 11, can, as illustrated, be provided with concaved seats 18 and 19 to cooperatively receive convex ends provided on the parts 16 and 17, whereby displacement of the unit A between the columns is prevented and semiuniversal movement is provided for between the opposing ends and surfaces to compensate for misalignment of parts.

One of the members 10 or 11 is provided with an annular axially projecting shield or wall 20 which occurs about and slidably receives the other member and in which one or a plurality of circumferentially spaced, radially inwardly and outwardly opening windows or ports 21 is or are provided. The port or ports 21 are arranged to occur in a radial plane adjacent to the inner face of said one member and are of such size or extent that when the body B is in its normal, uncompressed condition, a small portion of the total mass of the body B is in radial alignment with the port or ports and so that as the body is compressed the portion of the mass of the body occurring in radial alignment with the port or ports, increases. In the case illustrated, the ported shield 20 is carried by the member 11.

The sensing means further includes a radioactive sensing and reading device D, which device can be in the form of a Geiger counter, a scintillator or any other suitable device for detecting and reading the rate of emission from radioactive materials. Since the exact nature of the device D can vary widely in practice and since the use of different forms of reading devices would not alter or affect the spirit of the present invention, and, further, since the nature of such devices are well known to those skilled in the art, I will not burden this disclosure with further unnecessary detailed description of the device D. It will suffice to point out that the device D is provided with a means, such as crystal or gas filled tube, which is sensitive and reacts to bombardment by emissions from radioactive materials, a suitable circuit to pick up and amplify the reaction of the crystal or gas to the bombardment, and a suitable meter M to read or indicate the amplified signal from the circuit and calibrated in suitable or desired units. In the instant case, the meter can be calibrated to indicate the signal in force units, such as pounds.

In accordance with common practice, the device D can be provided with suitable controls to vary and adjust the sensitivity of the device, the amplification of the signal and to null or zero out the meter M.

With the means set forth above, it will be apparent that when the transducer A is unloaded and the body B is uncompressed and but a small portion of the total mass is in alignment with the port or ports 21, a steady, predetermined portion of the emission from the the body B escapes through the port or ports 21 in the shield 20, and the meter M can be nulled or zeroed out.

When force is subsequently exerted onto and through the transducer A, and the body B is compressed and so that a greater portion of the radioactive material is concentrated in alignment with the ports 21, the rate of emission from the unit A is varied and increased at a determinable and, therefore, known rate. The device D responds to the change in rate of emission from the unit A and records or indicates such change at the meter M. The meter M can then be read to determine the magnitude of force exerted onto and through the transducer.

In the form of the invention illustrated in FIG. 3 of the drawings, the radioactive element B' includes a blocklike body 22 of resilient, ductile, noncompressible material such as rubber or a rubberlike plastic and a compressible core of radioactive material within the body 22.

The core 23 is in the form or nature of a body of radioactive or radioactivated gas in an spherical cavity 24 within the body. In the case illustrated, the core 23 is contained within flexible shell or skin 23' of suitable material to facilitate manufacture of the element B' and to prevent the escape of the radioactive material into and through the body 22.

The body 22 is arranged in the bottom of an upwardly opening socket 25 in a block 26 of lead or other suitable, radioactive shielding material.

The block 26 is arranged in and held captive by a suitable housing 27 of steel or the like.

A suitable pressure plug 28 of like shielding material is engaged in the socket 25 above the element B' and, in the case illustrated, is provided with a suitable jacket or cap 28' of hard, tough material, such as steel about its sides and across its top to hold the body of the plug captive and to prevent its being deformed when subjected to vertical forces, from above.

The top of the housing 27 is provided with an access opening in alignment with the plug 28 and sockets 24 and through which a force transmitting member 16' projects to engage the top of the plug.

In practice, the block 26 can be provided with an inwardly projecting flange 30 at the top or upper end of the socket 24 and the plug 18 can be relieved, as at 31, to accommodate the flange, thereby providing a trap to prevent the direct escape of emission up through the space or clearance provided between the block and the plug.

In addition to the foregoing, the block 26 is provided with an outward port 32 in one of its sides and in which a quartz plug 33 is engaged and fixed. The housing 27 is further provided with a lateral port 34 in register with the port 32.

The port 32 is in axial alignment with the core 24 and has a diametric extent smaller than the diametric extent of the cord. For example, the diametric extent of the port 32 is preferably equal to the diametric extent of the core when the core is compressed to its smallest and most compressed condition and is, therefore, considerably small than the core when the latter is in its normal condition.

With the structure set forth above, it will be apparent that the radioactive element B' is suitably shielded to prevent radioactive contamination of surrounding equipment and to prevent forces outside of the transducer construction from interfering with and adversely affecting the radioactive material, or vice versa.

It will be further apparent that the ports 32 and 34 provide the only escape of emission from the element B' and control and direct the escaping emission in a predetermined manner. That is, the ports serve to direct the emission directly to the related device D.

While the structure set forth above is such that it will not contain all emissions, it is such that it will keep them within safe limits.

It will be apparent that when forces are exerted onto the body 22 of the element B' they are transmitted directly and uniformly onto and through the core 23, in all directions to compress the core radially inwardly whereby a greater mass of the core material occurs in alignment with the port 32 and the proportionately greater amount of emission from said material escapes through the port 32.

The quartz plug 33 in the port 32 prevents the escape or flowing of the body 22 out through the said port, but freely passes the emissions issuing from the core directly through said port.

The base portion 17' of the housing 27 is the equivalent of the member 17 in the first form of the invention.

In the form of the invention illustrated in FIGS. 4 and 5 of the drawings, I provide a blocklike body 40 having an upwardly opening cylinder bore 41, a piston 42 and an O-ring seal 43 engaged in the bore, a shielding disc 44 of lead or the like above the piston and work-engaging pusher rod or plunger 45 entering the upper end of the bore and engaging the disc 44.

The base portion $17^a$ of the block 40 is the equivalent of element 17 in the first form of the invention and the piston 42 is the equivalent of the member 16 in the first form of the invention.

Arranged in the bottom of the bore, beneath the piston, is a body or element $B^2$ of compressible radioactive material.

Engaged about the exterior of the body 40 is a jacket 46 of shielding material, such as lead. The top of the jacket is provided with an opening through which the plug 45 extends. The block is provided with a radially outwardly projecting boss 47 with an emission port 48 communicating with the bottom of the bore 41. The port 48 is closed with a quartz plug 49, which plug is kept by a retainer ring 50 screw threaded into the port.

The boss 47 projects through an opening in the jacket 46. As in the previous forms of the invention, the port 48 is smaller in diameter than the normal cross-sectional extent of the element B² and receives or accepts a portion of the emission from the element B² commeasurable with the portion of the mass of said element in alignment therewith and directs it to a related sensing and reading device, such as the device D shown in the first form of the invention.

In the form of the invention shown in FIG. 6 of the drawings, the element B³ is a bellows 60 filled with radioactive gas. Force transmitting members 16⁶ and 17⁶ are fixed to the opposite ends of the bellows.

In the case illustrated, a suitable telescoping housing 61 of radioactive shielding material and provided with a suitable emission port or emission ports 62 is provided about the bellows.

In this form of the invention, when the bellows is subjected to compressive forces, the gas is compressed and a greater mass of the gas occurs in alignment with the ports or ports whereby the amount of emission from the radioactive gas escaping through the port or ports is increased. Also, if the bellows is subjected to tensile forces, the gas is rarefied and the amount of escaping emission is decreased.

Accordingly, the last form of the invention provides a transducer which is double acting.

Having described only typical preferred forms and applications of my invention, I do not wish to be limited or restricted to the specific details herein set forth, but wish to reserve to myself any modifications and/or variations that may appear to those skilled in the art and which fall within the scope of the following claims:

Having described my invention, I claim:

1. A weight-force indicating means including a radioactivity sensing device, a resilient, compressible element of radioactive material remote from said device and force transmitting means related to said element whereby forces transmitted by the force transmitting means is applied to said element to vary its volumetric extent and resulting concentration of emission, shielding means related to the element and having an emission port smaller in cross section than the normal cross section of the element and in alignment with the sensing device.

2. A structure as set forth in claim 1 wherein said force transmitting means includes a pair of spaced, disc-shaped parts with opposing surfaces and said element is arranged between and in bearing engagement with said faces.

3. A structure as set forth in claim 1 wherein said shielding means includes a wall on one part surrounding the body between the parts and slidably engaging the other part.

4. A structure as set forth in claim 1 wherein said element includes a body of resilient, ductile, noncompressible material and a compressible core of radioactive material within the body, said parts being established of radiation shielding material, a wall on one part surrounding the body and slidably engaging the other port, the wall on said one port having a laterally outwardly opening port with a radiation conducting plug to direct radiation from the core outwardly in a predetermined direction and toward said device.

5. A structure as set forth in claim 1 wherein said element is an axially compressible metallic bellows with sealed ends and filled with radioactive gas.